Apr. 17, 1923.

A. H. HANSELMAN 1,452,377

FISHHOOK

Filed Feb. 24, 1922

Inventor
Arthur H. Hanselman
by A. S. Johnson
his Attorney.

Patented Apr. 17, 1923.

1,452,377

UNITED STATES PATENT OFFICE.

ARTHUR H. HANSELMAN, OF ST. PAUL, MINNESOTA.

FISHHOOK.

Application filed February 24, 1922. Serial No. 538,894.

*To all whom it may concern:*

Be it known that I, ARTHUR H. HANSELMAN, a citizen of the United States, residing at St. Paul, in the county of Ramsey and State of Minnesota, have invented certain new and useful Improvements in Fishhooks, of which the following is a specification.

My invention relates to improvements in fish hooks, and more particularly, to that class of hooks, having provision for holding the bait, without inflicting bodily injury, for the purpose of keeping it alive, a considerable period of time when submerged in the process of fishing.

An object of the invention, is to provide improved means in a fish hook, for holding a live frog, wherein the hook proper forms an important part of the harness, whereby the frog is held safely bound without injury.

The invention consists in the construction, combination and arrangement of parts hereinafter described and claimed.

In the drawings:—

Figure 1:
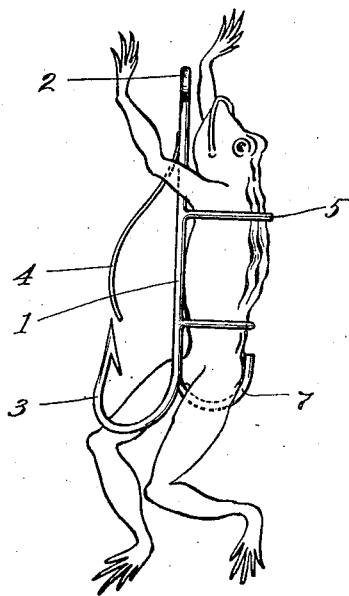
Figure 1, is a side elevation of my improved hook showing it in normal or use position.

My improved fish hook comprises an ordinary hook, consisting of a shank 1, formed at its top with an eye 2, to which a line may be attached, said shank having return bends at its lower end to form the hooks 3, the hooks opening upwardly alongside the shank.

The hook may, as shown, be provided with spring arms 4 secured to the underside of the shank and extending toward the hooks in the ordinary manner to keep the hooks from catching in weeds, etc. Carried by the shank and projecting outwardly therefrom is a pair of spaced rings 5 and 6, the ring 5 being relatively larger than the ring 6. Carried by the hook end of the shank on the side opposite to the hooks, is an arm 7, said arm being bent outwardly and upwardly toward the ring 6 so that the free end of the arm will stand in approximate alinement with the outer edge of the ring.

Figure 2:
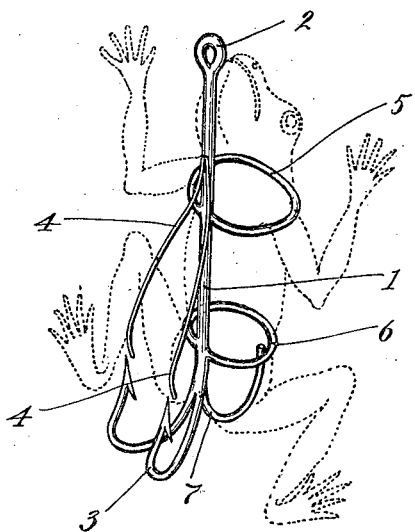
Fig. 2, is a view from the underside showing the frog in dotted lines.
Figure 3:
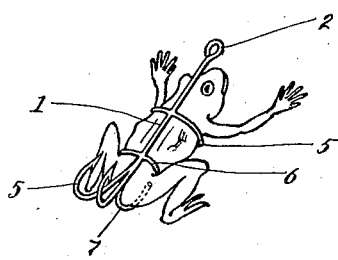
Fig. 3, is a top view of the hook, arranged oppositely to the positions shown in Figures 1 and 2.

In use, the frog is placed within the harness, formed by the rings 5 and 6, and the arm 7, as illustrated in Figs. 1 and 2, or Fig. 3. In placing the frog in position it is pulled rearwardly through the rings 5 and 6 with its rear legs straddling the arm 7, so that when in position the arm 7 forms a seat for the frog, and the ring 6 surrounds the frog at the smaller portion of its body adjacent to its rear legs and the ring 5 surrounds it at the larger portion of its body, adjacent to its front legs. The frog may be placed, as shown, in Figs. 1 and 2, facing the shank or as shown in Fig. 3, facing away from the shank. When the frog is thus supported within the harness it is left free for normal movement in the water as illustrated in the dotted line position shown in Fig. 2, and there being no parts pressing into the body of the frog, and the hooks extending, as they do, in a direction away from the body, no injury to the frog from the apparatus results, and the fisherman is, thereby, enabled to keep a living, active frog as bait.

I claim:

1. A fish hook, comprising a shank and supported hook, spaced rings carried by the shank and projecting therefrom oppositely to the hook, and an outwardly extending arm carried by the shank upon the ring side thereof.

2. A fish hook, consisting of a shank, a hook projecting from one side thereof, a pair of spaced rings carried by the shank and projecting therefrom oppositely to the hook, the ring toward the hook end of the shank being smaller than the other ring, and an arm carried by the hook end of the shank and projecting outwardly upon the ring side thereof.

3. A fish hook, consisting of a shank, a hook projecting from one side thereof, a pair of spaced rings carried by the shank and projecting therefrom oppositely to the hook, the ring toward the hook end of the shank being smaller than the other ring, and a curved arm carried by the hook end of the shank, said arm being directed outwardly from the shank and upwardly toward the outer edge of the adjacent ring.

In testimony whereof I affix my signature.

ARTHUR H. HANSELMAN.